(12) United States Patent
Misek

(10) Patent No.: US 7,279,668 B2
(45) Date of Patent: Oct. 9, 2007

(54) SEQUENTIAL READ-OUT METHOD AND SYSTEM THAT EMPLOYS A SINGLE AMPLIFIER FOR MULTIPLE COLUMNS

(75) Inventor: Brian James Misek, Fort Collins, CO (US)

(73) Assignee: Micron Technology, Inc., Boise, ID (US)

(*) Notice: Subject to any disclaimer, the term of this patent is extended or adjusted under 35 U.S.C. 154(b) by 198 days.

(21) Appl. No.: 09/981,957

(22) Filed: Oct. 16, 2001

(65) Prior Publication Data
US 2003/0071195 A1    Apr. 17, 2003

(51) Int. Cl.
*H01L 27/00* (2006.01)
*H04N 5/217* (2006.01)

(52) U.S. Cl. ............................. 250/208.1; 250/214 A; 348/241

(58) Field of Classification Search ............. 250/208.1, 250/208.2, 214 R, 214 A; 348/241, 300, 348/301; 327/514
See application file for complete search history.

(56) References Cited

U.S. PATENT DOCUMENTS

| 4,760,345 | A | | 7/1988 | Buesser et al. |
| 5,363,055 | A | * | 11/1994 | Ribner ........................ 330/9 |
| 5,892,540 | A | | 4/1999 | Kozlowski et al. |
| 5,982,424 | A | * | 11/1999 | Simerly et al. ........... 348/229.1 |
| 6,166,769 | A | * | 12/2000 | Yonemoto et al. .......... 348/308 |
| 6,222,175 | B1 | * | 4/2001 | Krymski .................. 250/208.1 |
| 6,873,364 | B1 | * | 3/2005 | Krymski .................... 348/308 |
| 6,885,396 | B1 | * | 4/2005 | Panicacci et al. ........... 348/241 |
| 2001/0033337 | A1 | | 10/2001 | Sakuragi |

FOREIGN PATENT DOCUMENTS

JP    285472    1/1999
JP    251555    9/2001

* cited by examiner

*Primary Examiner*—Thanh X. Luu
(74) *Attorney, Agent, or Firm*—RatnerPrestia

(57) ABSTRACT

Sequential read-out method and system for reading out an array of photocells are disclosed. The array includes a plurality of photocells that are arranged in rows and columns. A sequential readout circuit is provided for reading out the values of each photocells in a sequential fashion. The sequential readout circuit processes one photocell at a time and can, for example, determine a difference between a final integration light value and a reset value for each photocell in a time sequential manner.

9 Claims, 7 Drawing Sheets

SEQUENTIAL READ-OUT METHOD AND SYSTEM THAT EMPLOYS A SINGLE AMPLIFIER FOR MULTIPLE COLUMNS

FIELD OF THE INVENTION

The present invention relates generally to photocell applications, and more particularly, to a sequential read-out method and system that employs a single amplifier for multiple columns.

BACKGROUND OF THE INVENTION

There are many photocell applications. These photo cell applications use an array of photocells and related electronics to image objects of interest. Photocell applications can be generally categorized into far field applications and near field applications. An example of a far field application is a free space pointer that is utilized in hand-held video game controllers. A user holds the game controller in one's hand and moves one's hand to control a graphic element on the display. In these applications, the array of photocells is utilized to track the relative motion of the hand based on a distant pattern (e.g., pattern on the display).

An example of near field applications is an optical mouse that images the texture of a surface to provide cursor control. Other examples include hand-held scanners and movement encoder applications also employ arrays of photocells.

FIG. 6 illustrates a prior art architecture for sampling an array of photocells. The architecture includes an array of photocells that are arranged into R rows and C columns. The output voltage of each photocell is read out by employing a row and column address scheme.

Typically a row of photocells is provided as outputs onto the C columns. The photocell output voltage is commonly derived by a source follower that utilizes a column current source to provide the bias current.

The prior art architecture also provides an amplifier at the bottom of each column for reading out the output voltage of the photocells of the selected row. The amplifier can provide a sampling function, an offset cancellation, and buffering function for the column voltage.

One disadvantage of this prior art architecture is that requiring an amplifier for every column increases the number of components in the design, thereby increasing the size of the design. The increased size of the design translates to a higher cost to manufacture the circuit. Since space and cost considerations are important to achieve a competitive advantage in the marketplace, it is desirable for there to be an architecture that conserves area and reduces costs.

A second disadvantage of the prior art architecture is that the gains of the amplifiers in the different columns need to be matched in order to eliminate the stripping that would be apparent in the image due to the gain differentials. Gain matching for the amplifiers from column to column is difficult, time-consuming, and costly process. Consequently, it is desirable for there to be an architecture that obviates gain matching.

A third disadvantage of the prior art architecture is that the power consumed by the individual amplifiers is a major limiting factor in the use of these devices in battery powered applications in which the imager is on for significant portions of the time.

Based on the foregoing, there remains a need for a read-out circuit that overcomes the disadvantages set forth previously.

SUMMARY OF THE INVENTION

According to one embodiment of the present invention, a sequential read-out method and system for reading out an array of photocells are described. The array includes a plurality of photocells that are arranged in rows and columns. A sequential readout circuit is provided for reading out the values of each photocell in a sequential fashion. The sequential readout circuit processes one photocell at a time and can, for example, determine a difference between a final integration light value and a reset value for each photocell in a time sequential manner. The sequential readout circuit can include a sample circuit for each column of photocells for sampling the output of the photocells of the respective column. The sequential readout circuit can include a single charge conversion circuit (e.g., an amplifier) for reading out the sampled value of the respective sample circuit in a time sequential manner. The sequential readout circuit also can include a column switch for each column that selectively connects the sample circuit of the respective column to the charge conversion circuit.

According to one embodiment of the present invention, a method of sampling an array of photocells is provided. First, the photocells of a current row are sampled. The sampled values are then held by a respective sample and hold circuit (e.g., one sample and hold circuit per column). Next, the photocells of the current row are reset. Then, each photocell in the current row is processed one photocell at a time. For example, the difference between a first voltage level and a second voltage level of each photocell in the current row may be determined and read-out in a time sequential manner.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A sequential read-out method and system that employs a single amplifier for at least two photocells that are disposed in different columns are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 10

Figure 1:
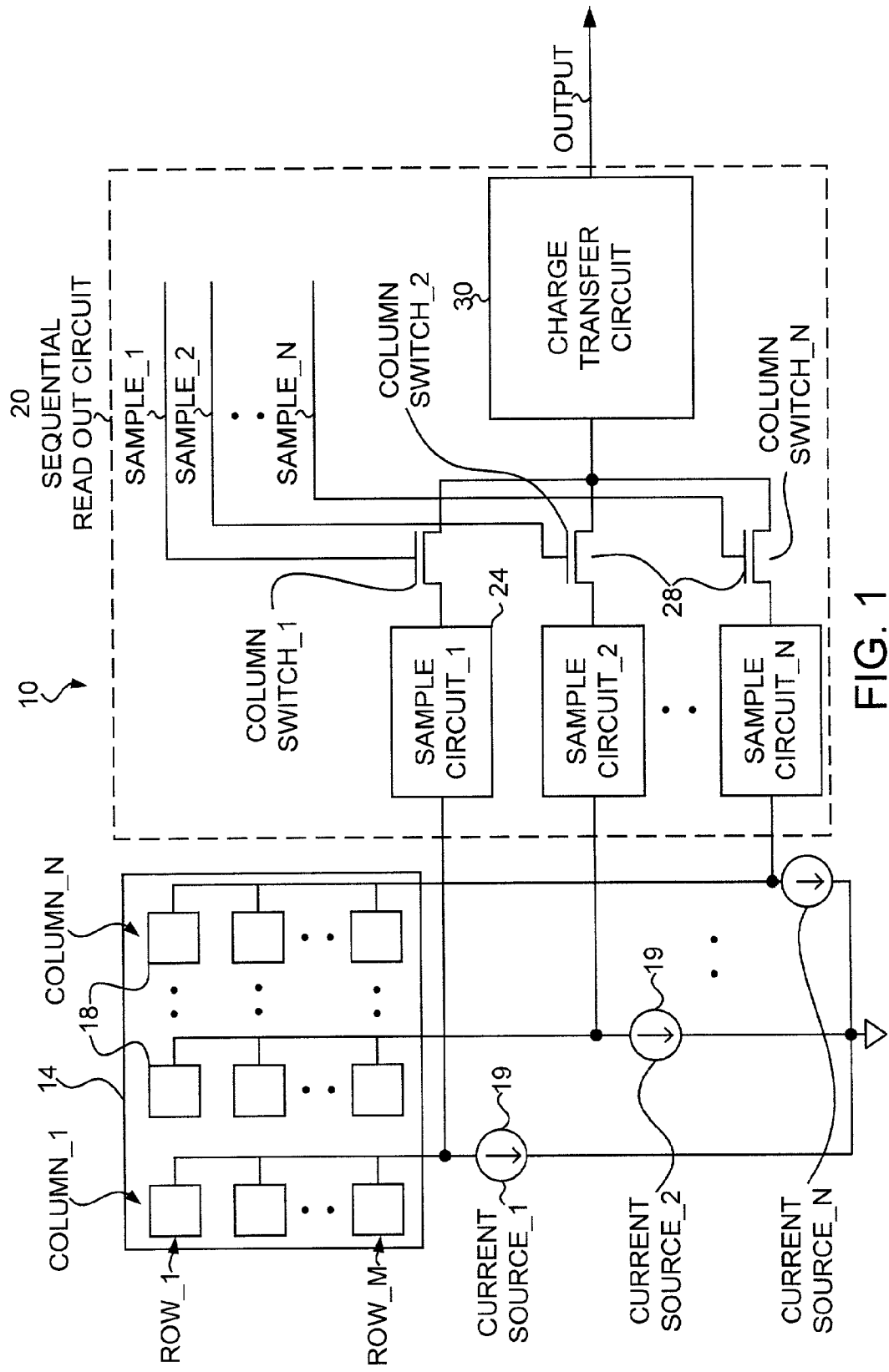
FIG. 1 is a block diagram of a system according to one embodiment of the present invention that includes an array of photocells and a sequential readout circuit.

FIG. 1 is a block diagram of a system 10 according to one embodiment of the present invention that includes an array of photo cells and a sequential readout circuit. The system 10 includes an array 14 of photocells 18. For example, the photo cells 18 can be arranged in M rows (i.e., row_1, row_2, row_M) and N columns ((i.e., column_1, column_2, . . . column_N). Each column typically includes a current source 19 (e.g., column source_1, column source_2, . . . , column source_N) for providing bias to the output buffers in the photo cells attached to the column. The construction and operation of current sources are well known by those of ordinary skill in the art and shall not be described in greater detail herein.

The number of rows and columns in the array of photocells varies based on the resolution requirements of the specific application. For example, in an optical mouse application, a sixteen by sixteen array of photocells is typically employed. Scanning applications typically include an array of forty-eight by forty-eight photocells. For these applications, each photocell can have dimensions, for example, in the range of about 30 to 60 microns on each side.

The system 10 includes a sequential read-out circuit 20 that is coupled to the array 14. The sequential read-out circuit 20 includes a plurality of sample circuits 24, where there is one sample circuit for each column. The sample circuits 24 can be implemented as a capacitor as described in greater detail in FIG. 2.

The sequential read-out circuit 20 also includes a plurality of column switches 28, where there is one switch for each column. Each column switch is controlled by a control signal (e.g., SAMPLE_1, SAMPLE_2, . . . , SAMPLE_N). The sequential read-out circuit 20 also includes a charge transfer circuit 30 (also referred to herein as a charge conversion circuit) that is shared by the columns. The charge conversion circuit 30 converts the charge of each sample circuit of the columns in a sequential fashion.

The switches 28 can be implemented as a transistor as shown. However, it is noted that the switches 28 may be implemented by any circuit that selectively makes an electrical connection between the sample circuit 24 and the charge conversion circuit 30. The switches can include, for example, but is not limited to full transfer gates, NMOS transistors, PMOS transistors, and charge compensated transistor switches.

The charge conversion circuit 30 can be implemented as an amplifier as described in greater detail hereinafter with reference to FIG. 2. However, it is noted that the charge conversion circuit 30 may be implemented by any circuit that converts charge provided by the sample circuit 24 to an output voltage. The charge conversion circuit 30 can be implemented by, for example, fully differential operational amplifiers, simple single stage single ended operational amplifiers, and transimpedance amplifiers.

Exemplary Implementation of a System with a Sequential Read-Out Circuit

Figure 2:
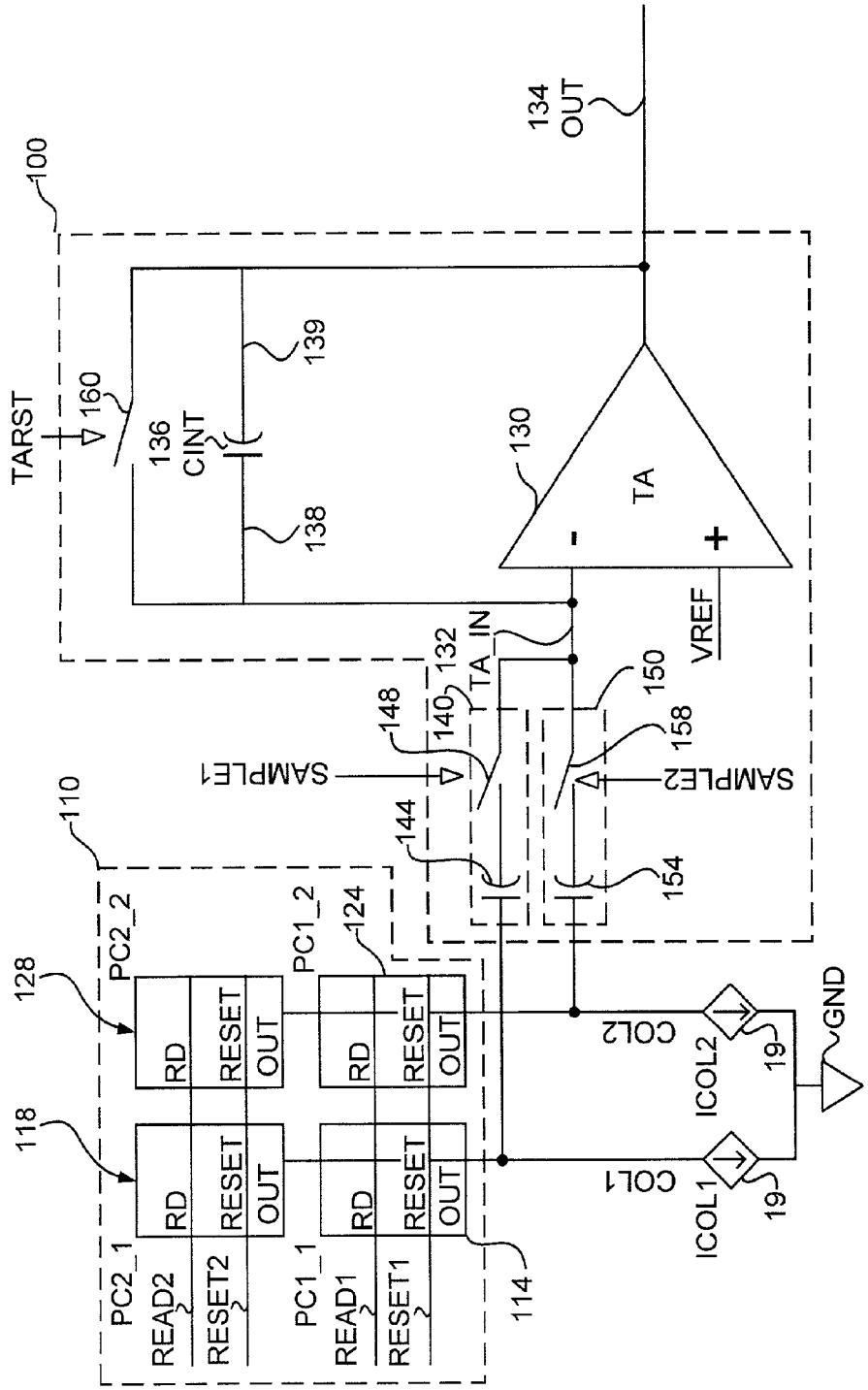
FIG. 2 is schematic diagram illustrating in greater detail the system of FIG. 1 according to one embodiment of the present invention.

FIG. 2 is a schematic diagram illustrating an exemplary implementation of the system 10 of FIG. 1. The sequential read-out circuit 100 is coupled to an array 110 of photocells that are arranged in rows and columns. For example, the array 110 may include R rows and C columns.

In this example, the sequential readout circuit 100 is selectively connected to photocells (e.g., a first photocell 114) in a first column 118 through pass transistor_1 and photocells (e.g., a second photocell 124) in a second column 128 through pass transistor_2. It is noted that the sequential read-out circuit 100 is selectively connected to every column in the array 110 through a respective column switch circuit.

The sequential read-out circuit 100 includes a single amplifier 130 that is coupled to the first photocell 114 and the second photocell 124. The amplifier 130 is also referred to herein as a transfer amplifier (TA) 130 that transfers charge between the input and the output of the amplifier. The amplifier 130 processes each photocell in the array in a time-sequential manner (i.e., one photocell at a time). For example, the photocells may be processed (e.g., read-out) row-by-row, where each photocell in a respective row is processed one photocell at a time. Specifically, the amplifier 130 performs a difference function for each photocell.

For example, the amplifier 130 determines the difference between a reset voltage ($V_{reset}$) and a light voltage ($V_{light}$) for the first photocell 114. Once the first photocell 114 has been processed, the amplifier 130 determines the difference between a reset voltage ($V_{reset}$) and a light voltage ($V_{light}$) for the second photocell 124. This processing proceeds until all the photocells of the current row have been processed.

The amplifier 130 includes a first input 132, an output 134, an integration capacitor 136. The integration capacitor 136 includes a first electrode 138 for coupling to the first input 132 and a second electrode 139 for coupling to the output 134 of the amplifier 130. The amplifier 130 includes a charge transfer mode and a unity gain mode, which are described in greater detail hereinafter.

The sequential read-out circuit 100 can also include a switch 160 (e.g., a transistor) that is responsive to a reset signal (e.g., a TARST signal) for resetting the amplifier 130. As described in greater detail hereinafter with reference to FIG. 7, a first mechanism may be coupled to the input 132 and the output 134 of the amplifier for performing a level shift of the output of the amplifier 130. A second mechanism may be coupled to the input 132 and the output 134 of the amplifier for performing gain manipulation of the amplifier 130.

The sequential read-out circuit 100 also includes a first sample and hold circuit 140 that is coupled to the first photocell 114 for sampling and holding the output voltage of the first photocell 114. The first sample and hold circuit 140 includes a first sampling capacitor 144 and a first switch (e.g., transistor 148) that is coupled to the first sampling capacitor 144. The first switch 148 selectively forms an electrical connection between the first column and the input 132 of the amplifier 130 in response to a first control signal (e.g., SAMPLE_1).

The sequential read-out circuit 100 also includes a second sample and hold circuit 150 that is coupled to the second photocell 124 for sampling and holding the output voltage of the second photocell 124. The second sample and hold circuit 150 includes a second sampling capacitor 154 and a second switch (e.g., transistor 158) that is coupled to the second sampling capacitor 154. The second switch 158 selectively forms an electrical connection between the second column and the input 132 of the amplifier 130 in response to a second control signal (e.g., SAMPLE_2).

Photo Cell 300

Figure 3:
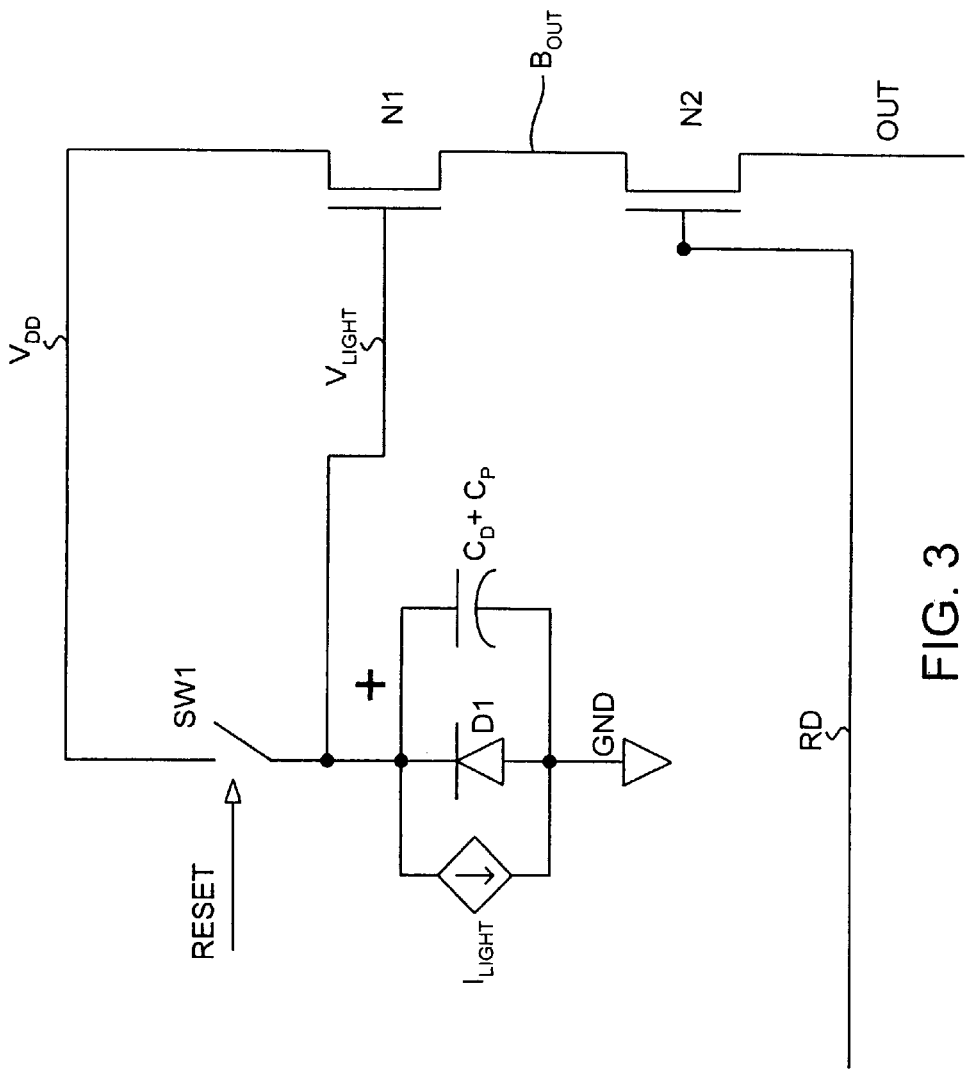
FIG. 3 illustrates in greater detail an exemplary photo cell architecture that can be utilized in FIG. 1 according to one embodiment of the present invention.

FIG. 3 illustrates in greater detail an exemplary photo cell architecture that can be utilized in FIG. 1 according to one embodiment of the present invention. The cell 300 includes a photodiode (D1) for detecting light and responsive thereto for generating a voltage representation thereof. The cell 300 includes an integration node (hereinafter referred to as a Vlight node). The cell 300 also includes a first switch (SW1)

that is coupled to the photodiode for resetting the integration node in response to a reset signal (RESET). The cell 300 includes a first transistor (N1) that is coupled to the integration node for shifting the level of the voltage at the integration node to a level-shifted voltage ($B_{out}$). The cell 300 also includes a second transistor (N2) that is coupled to the first transistor (N1) for reading out the level-shifted voltage in response to a read signal (RD). The output of the cell 300 is then provided to the sample circuit 24.

The photo-diode is modeled for ease of understanding by a current source Ilight, which represents the photo current that is generated in the reversed bias diode in response to the generation of electro-hole pairs by photon absorption by the silicon. This current is the signal that is of importance in the photodetector. The capacitor Cd+Cp represents the capacitance on the node Vlight. This capacitance includes the photodiode reversed bias capacitance and the parasitic capacitance on the node that includes interconnect capacitance, the diffusions of the SW1, and the input gate capacitance of N1.

The array may be utilized in one of a variety of different applications. These applications include, for example, but are not limited to, an optical mouse, scanner applications, movement encoders, and far-field applications. An example of a far-field application is a video game controller or other free space pointing application.

One novel aspect of the sequential read-out circuit of the present invention is the provision of a sample circuit for each column of the array and a single amplifier that is shared by the columns. The sample circuit provides a sampling function. The photocells of different columns in a particular row are sampled at the same time by the sample circuit. The amplifier reads each column in a sequential manner. In this manner, the photocells of different columns in the same row are read.

The architecture of the present invention is particularly attractive for applications that employ medium sized arrays. For example, the architecture of the present invention may be implemented in an exemplary application, where the array includes sixty-four (64) rows and sixty-four (64) columns of photocells.

Figure 4:
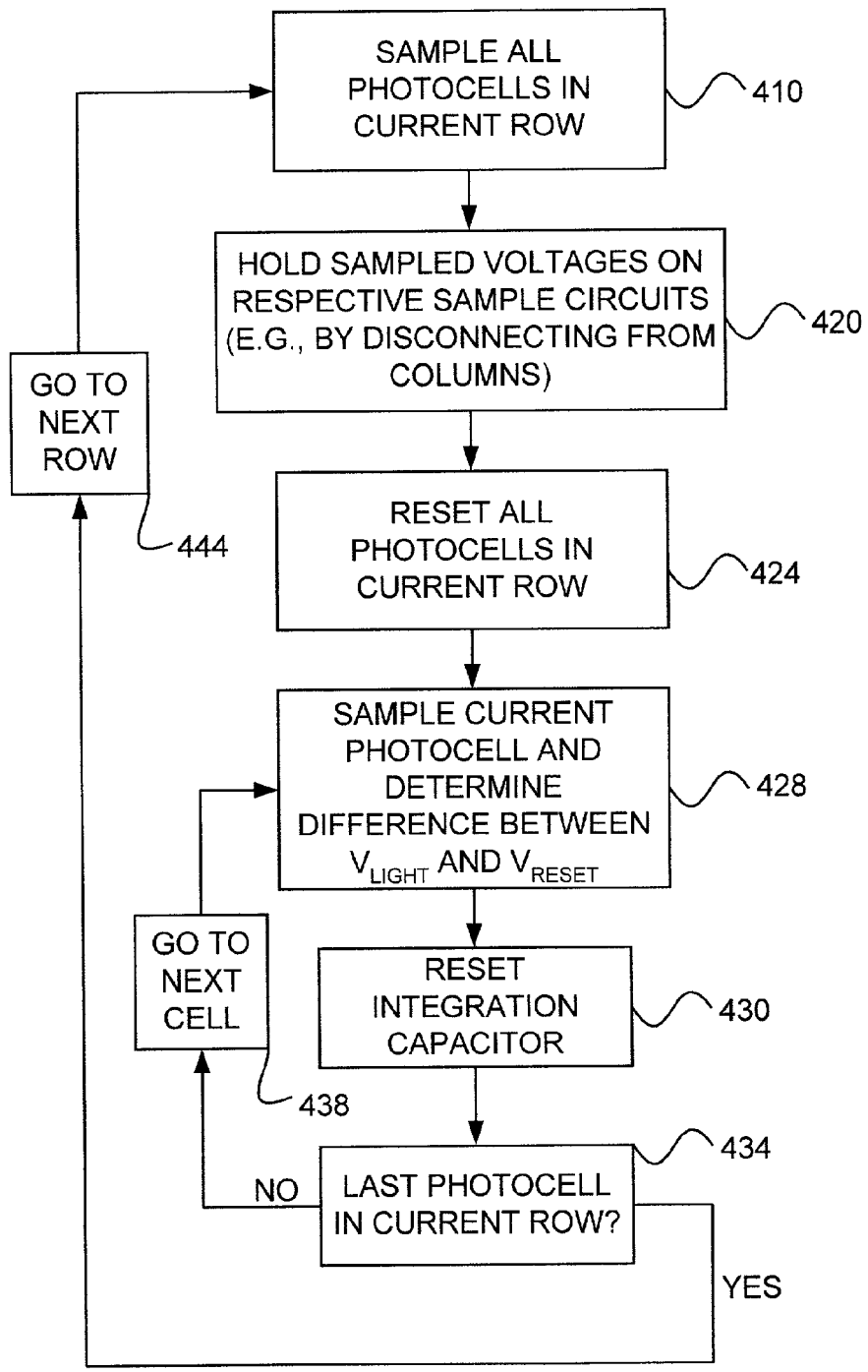
FIG. 4 is a flowchart illustrating the steps performed by the sequential readout circuit of FIG. 1.

FIG. 4 is a flowchart illustrating the steps performed by the sequential read-out circuit 20 of FIG. 1. In step 410, the output of all the photocells in a first row (e.g., the photocells in row_1) is sampled (e.g., sampled onto a respective column sample circuit). In step 420, the sample circuits are removed from the respective columns so that the output of the photocells of the first row is held (e.g., held on each respective sample circuit). In step 424, the photocells of the first row are reset (e.g., reset with a predetermined internal voltage). In step 428, the current photocell is sampled and the difference between Vlight and Vreset is determined. In step 430, the integration capacitor is reset. In step 434, it is determined whether the last photocell in the row has bee processed. When it is determined that the last photocell in the row has been processed, processing proceeds to step 444, where the the next row is processed (e.g., a row index is incremented). It is noted that steps 410 to 434 are then repeated for each row until all photocells have been processed.

When it is determined that the last photocell in the row has not yet been processed, processing proceeds to step 438, where the next photocell is processed (e.g., a column index is incremented). Processing then proceeds to step 428. Steps 428 to 438 are repeated for each photocell in a current row.

In processing step 428, photocells of the first row are sampled and the difference of each photocell is determined in a column-by-column fashion one photocell at a time. For example, the photocell in the first column of the first row is sampled. Specifically, when the photocell in the first column of the first row is sampled, the charge transfer circuit 30, which includes the integration capacitor, determines the difference between the first sampled voltage (e.g., Vlight) and the second voltalge level (Vreset) of the current photocell, thereby generating a voltage level that represents the amount of light received by the current photocell. The integration capacitor is then reset for the next photocell.

The photocell in the second column of the first row is then sampled. The charge transfer circuit 30, which includes the integration capacitor, determines the difference between the first sampled voltage (e.g., Vlight) and the second voltalge level (Vreset) of the current photocell, thereby generating a voltage level that represents the amount of light received by the current photocell. The integration capacitor is then reset for the next photocell. This sequence of steps is performed for all photocells in the row.

Processing then continues at step 410 where all the photocells in the next row are sampled onto the respective sample circuits.

The sample, hold, and convert stages are described in greater detail hereinafter.

Sample Stage

The amplifier has a reset mode and a charge transfer mode. During the reset mode of the amplifier, the column switches (e.g., first column switch and second column switch) are closed. In this regard, all photocells in a current row are sampled. For example, one side of each sample capacitor is tied to predetermined reference voltage (e.g., Vref) by virtue of the amplifier output being at Vref during unity gain mode. The second side of each sample capacitor is tied to the output voltage of a respective photocell (Vlight) through the output buffer N1 via the read transistor N2. In this stage, the output of all the photocells in a current row is sampled onto a respective column sample circuit (e.g., a respective column capacitor).

Hold Stage

In this stage, the column switches 148 are opened, and the charge information is held on the sampling capacitors. The photocells in the current row being read are reset to a starting voltage (Vreset). Since one side of the sampling capacitor (CSAMPLE) is open, none of the charge is disturbed from the original sampling.

Convert Stage

In this stage, the amplifier is placed into charge transfer mode. The first column is now connected to the amplifier via the column switch 148. The charge difference that moves the original voltage across the sample capacitor, Vlight-Vref to Vreset-Vref is transferred to the integration capacitor (CINT) of the amplifier, thereby causing a change in the output voltage equal to (Vlight-Vreset)*(CSAMPLE/CINT), which is the desired result. The output voltage is sampled by the down stream electronics. The integration capacitor (CINT) is then reset, and the sample capacitor (also referred to as the column capacitor) is removed.

The amplifier is placed into charge transfer mode, and the reading of the next column commences. After all the columns are read, the amplifier is left in reset, and the next row is sampled and then held. Then, the columns are converted one by one as described above.

Timing Diagram

Figure 5:
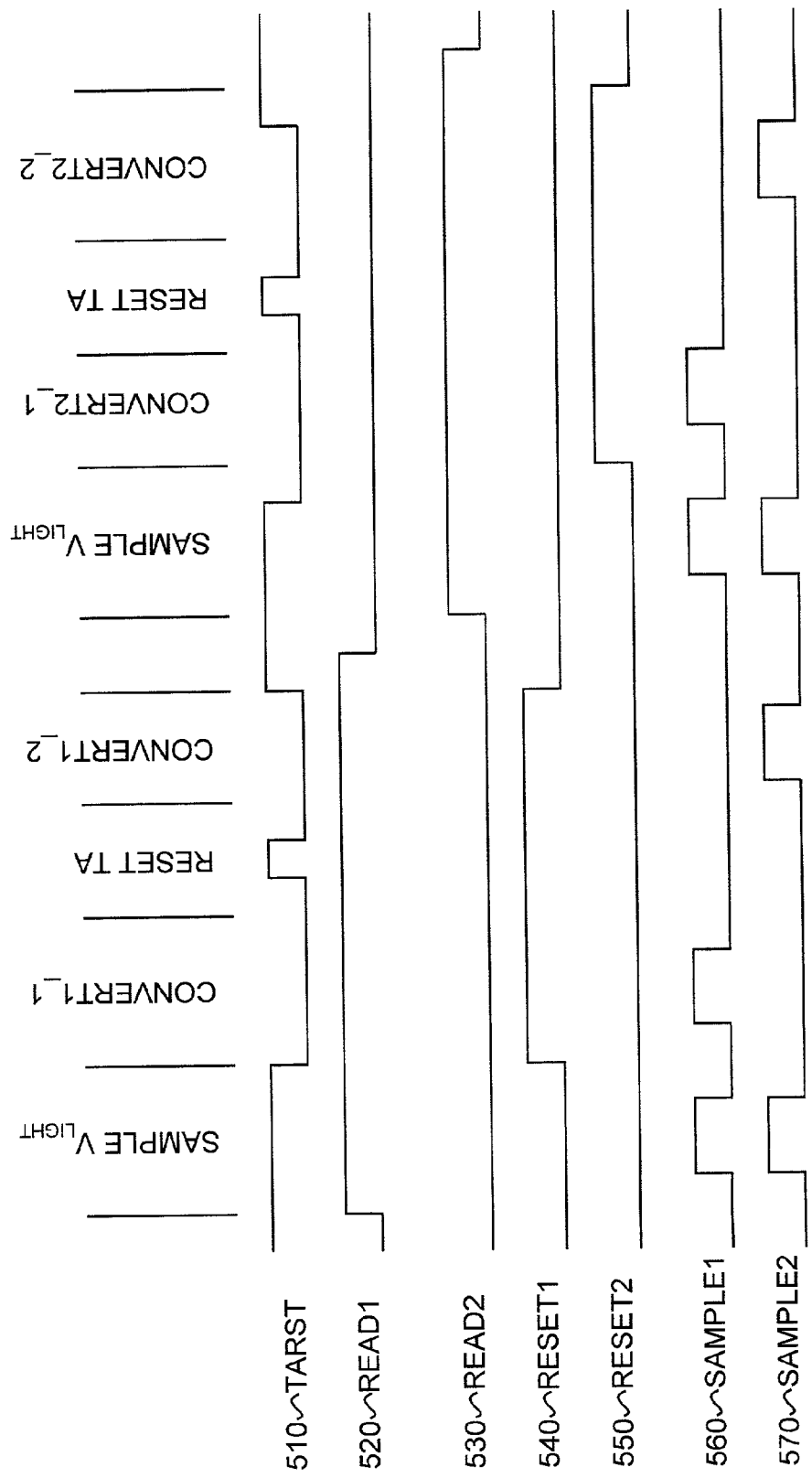
FIG. 5 illustrates a timing diagram showing selected signals of FIG. 1.
Figure 6:
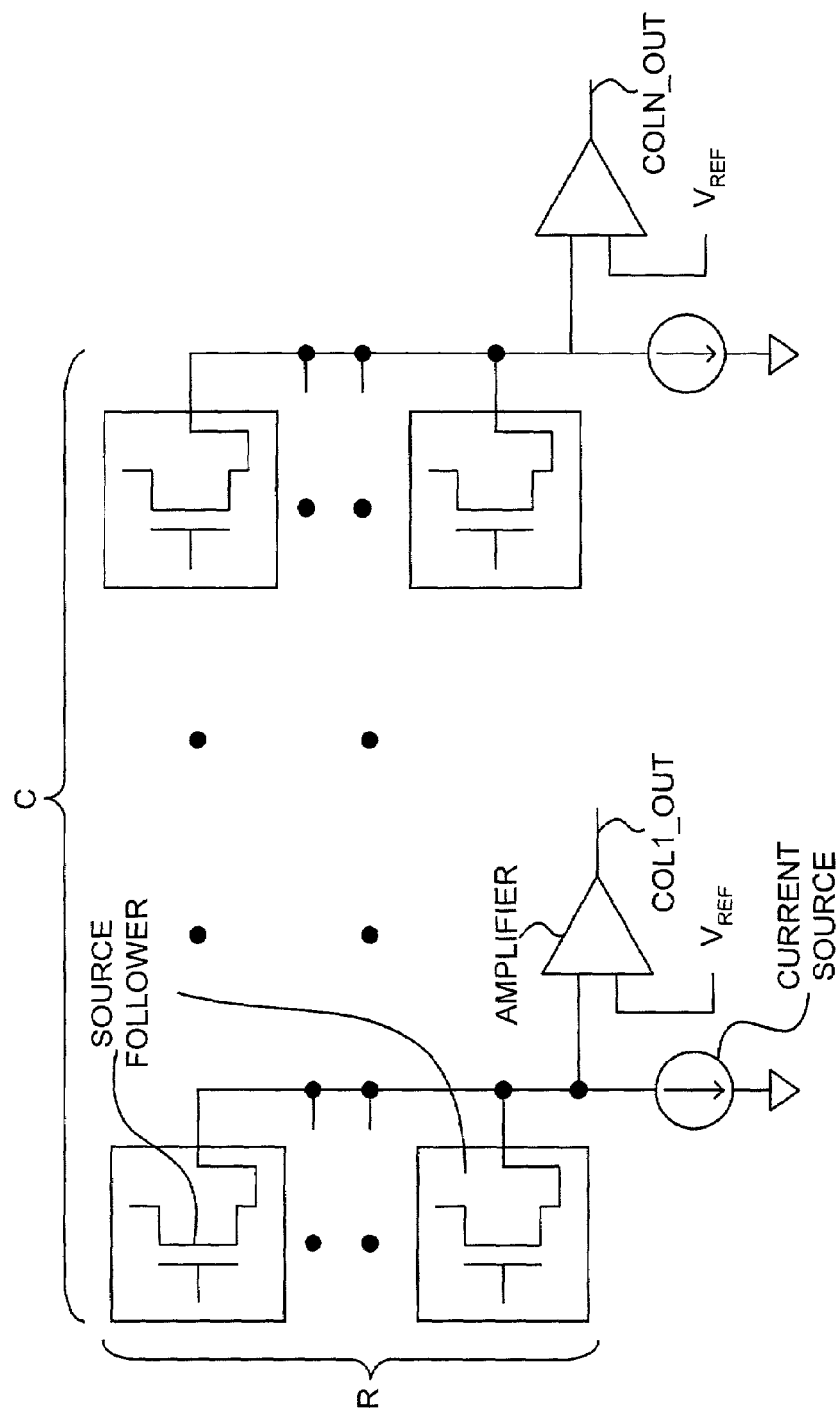
FIG. 6 illustrates a prior art photocell architecture.

FIG. 5 illustrates a timing diagram showing selected signals of FIG. 2. In this example, there are two rows and two photocells in each row. An amplifier reset signal 510 (TARST) is provided to reset the amplifier. The read signals 520 and 530 (i.e., READ_1 and READ_2) selectively switches the output transistors (transistor N2) in the photocells for the first and second rows, respectively. The reset signals 540 and 550 (i.e., RESET_1 and RESET_2) selectively connect the $V_{light}$ nodes in the photocells for the first and second rows, respectively, to a predetermined voltage (e.g., $V_{DD}$). The sample signals 560 and 570 (i.e., SAMPLE_1 and SAMPLE_2) selectively connect the capacitors for the first and second columns to the negative input of the amplifier.

In this example, the photocells of the first row (photocells PC1_1 and PC1_2) are processed first. Thereafter, the photocells in the second row (photocells PC2_1 and PC2_2) are processed. During the processing of the photocells of the first row, the following steps may be performed. First, all the photocells in the first row are sampled. The sampled values are then held by the sample circuit for each respective column. The photocells in the first row are then reset. Then, each photocell in the first row is converted one photocell at a time (i.e., in a time sequential manner) by the amplifier. For example, the photocell PC1_1 in the first column is first converted by the amplifier and then the photocell PC1_2 in the second column is converted by the amplifier.

During the processing of the photocells of the second row, the following steps may be performed. First, all the photocells in the second row are sampled. The sampled values are then held by the sample circuit for each respective column. The photocells in the second row are then reset. Then, each photocell in the second row is converted one photocell at a time (i.e., in a time sequential manner) by the amplifier. For example, the photocell PC2_1 in the first column is first converted by the amplifier and then the photocell PC2_2 in the second column is converted by the amplifier.

During the reading of the first row, the READ_1 signal is asserted so that the voltage ($V_{light}$) of the photo cells in the first row are provided to the respective sample circuit (e.g., capacitors). As described earlier, there is a sample circuit for each column in the array.

It is noted that both sample signals are asserted during the sampling of the $V_{light}$ for the first row. When the first photo cell of the first row is being converted, the first sample signal 560 is asserted, while the second sample signal 570 is not asserted. When the amplifier is being reset, both the first sample signal 560 and the second sample signal 570 are not asserted. When the second photo cell of the first row is being converted, the second sample signal 570 is asserted, while the first sample signal 560 is not asserted.

Similarly, both sample signals are asserted during the sampling of the $V_{light}$ for the second row. When the first photo cell of the second row is being converted, the first sample signal 560 is asserted, while the second sample signal 570 is not asserted. When the amplifier is being reset, both the first sample signal 560 and the second sample signal 570 are not asserted. When the second photo cell of the second row is being converted, the second sample signal 570 is asserted, while the first sample signal 560 is not asserted.

Both output voltages (Vlight and Vreset) are needed for processing each photocell. Specifically, the difference of these two voltages (Vlight and Vreset) is proportional to the light that is received during the integration time of the pixel. The read signal (e.g., READ1 and READ2) places the buffered version of the voltage at Vlight of each photocell of a respective row onto an associated column when the buffer is biased with the column current source. The reset signal (e.g., RESET1 and RESET2) recharges the Vlight node of each photocell of a respective row to the reset voltage. This signal can be lowered after the row is converted and provide a rolling shutter function or it can be held high until a common start of conversion is commenced, and then all the reset signals are released.

Figure 7:
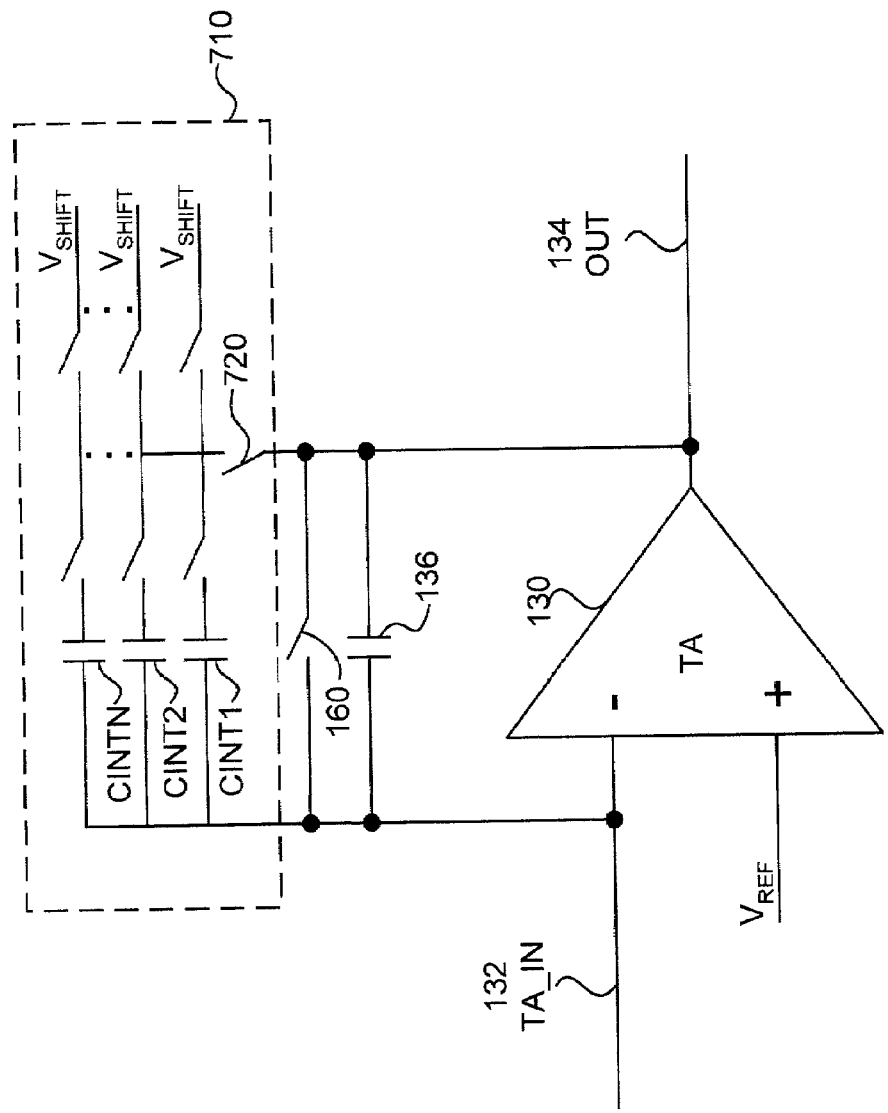
FIG. 7 is a diagram that illustrates exemplary circuits that may be added to FIG. 2 for gain manipulation and level shifting

FIG. 7 illustrates a diagram that illustrates exemplary circuits that may be coupled to the amplifier of FIG. 2 for gain manipulation and level shifting. A first mechanism 710 (e.g., a VSHIFT voltage and switch circuit elements) may be coupled to the first input 132 and the output 134 of the amplifier 130 for performing level shifting of the output of the amplifier 130. The first mechanism 710 can include a second mechanism (e.g., capacitor and switch circuit elements) that is coupled to the first input and the output of the amplifier for performing gain manipulation of the amplifier 130.

For example, the voltage (VSHIFT) may be employed to modify or set the zero difference of the amplifier. A plurality of different integration capacitors (e.g., CINT_1, CINT_2, . . . , CINT_N) that may have different capacitor values are provided to affect the gain of the amplifier 130. A switch 720 is provided to utilize the first and second mechanisms for level shifting and gain manipulation.

One advantage of the architecture is that a single amplifier is employed for multiple columns instead of an amplifier for each column used by the prior art approaches. By reducing the number of components in the design, the present invention reduces costs, saves power for cordless applications, and reduces silicon area.

Another advantage of the read out architecture of the present invention is that since a single amplifier is utilized across columns, gain matching from column to column, which can be a difficult, time-consuming, and costly process, is obviated.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A sequential read-out circuit comprising:
    a first sample and hold circuit that includes a first sampling switch and a first sampling capacitor, the first sampling capacitor having a first and a second electrode;
    a first photocell in an array of photocells, the first photocell comprising a first read switch and a first photodiode, the first read switch being operable to couple the first photodiode to the first electrode of the first sampling capacitor; and
    an amplifier having a positive input terminal coupled to a reference voltage, the amplifier configured for operation in one of a unity gain mode and a charge transfer mode, wherein when operating in the unity gain mode, the first sampling switch is operable to couple the second electrode of the first sampling capacitor to a negative input terminal of the amplifier, thereby placing the second electrode of the first sampling capacitor at a voltage level equal to the reference voltage;
    a second sample and hold circuit that includes a second sampling switch and a second sampling capacitor, the second sampling capacitor having a first and a second electrode;
    a second photocell in an array of photocells, the second photocell comprising a second read switch and a second photodiode, the second read switch being operable to couple the second photodiode to the first electrode of the second sampling capacitor; and wherein the first sampling switch is operable to uncouple the second electrode of the first sampling capacitor from the negative input terminal of the amplifier and the second sampling switch is operable to couple the second electrode of the second sampling capacitor to the negative input terminal of the amplifier, thereby placing the second electrode of the second sampling capacitor at the reference voltage.

2. The sequential read-out circuit of claim 1, further comprising a first integration capacitor coupled between the negative input terminal of the amplifier and an output terminal of the amplifier whereby the amplifier is configured when placed in the charge transfer mode of operation, to provide a first voltage gain that is referenced to the voltage reference.

3. The sequential read-out circuit of claim 2, further comprising a first switching element having a first electrode coupled to the first integration capacitor and a second electrode coupled to the output terminal of the amplifier, the first switching element being operable to selectively couple the first integration capacitor to the output terminal of the amplifier.

4. The sequential read-out of claim 3, further comprising a second switching element having a first electrode coupled to a shift voltage and a second electrode coupled to the output terminal of the amplifier, the second switching element being operable to set the output terminal of the amplifier at the shift voltage.

5. The sequential read-out circuit of claim 2, further comprising a second integration capacitor selectively coupled between the negative input terminal of the amplifier and the output terminal of the amplifier whereby the amplifier is configured when placed in the charge transfer mode of operation, to provide a second voltage gain that is referenced to the reference voltage.

6. The sequential read-out circuit of claim 5, further comprising a third switching element having a first electrode coupled to the second integration capacitor and a second electrode coupled to the output terminal of the amplifier, the third switching element being operable to selectively couple the second integration capacitor to the output terminal of the amplifier.

7. The sequential read-out circuit of claim 1 wherein the amplifier is selectively coupled (a) between the negative input terminal of the amplifier and the second electrode of the first sampling capacitor, and (b) between the negative input terminal of the amplifier and the second electrode of the second sampling capacitor.

8. The sequential read-out circuit of claim 1 wherein, when operated in the unity gain mode, the first electrode of the first sampling capacitor is coupled to a voltage $V_{light}$ generated by the first photodiode and the second electrode of the first sampling capacitor is placed at the reference voltage; and when operated in the charge transfer mode, the amplifier provides a first output voltage constituting a read-out of the first photodiode.

9. The sequential read-out circuit of claim 8, further comprising:

a second sample and hold circuit comprising a second sampling capacitor; and wherein when operated in the charge transfer mode, the amplifier provides a second output voltage constituting a read-out of the second photodiode.

\* \* \* \* \*